(12) United States Patent
Konet (10) Patent No.: US 7,490,885 B1
(45) Date of Patent: Feb. 17, 2009

(54) VEHICLE BODY WITH EXPANDABLE VEHICLE BODY PANEL

(75) Inventor: Heather S Konet, Canton, MI (US)

(73) Assignee: Nissan Technical Center North America, Inc. MI (US)

( * ) Notice: Subject to any disclaimer, the term of this patent is extended or adjusted under 35 U.S.C. 154(b) by 0 days.

(21) Appl. No.: 12/037,624

(22) Filed: Feb. 26, 2008

(51) Int. Cl.
*B60N 99/00* (2006.01)

(52) U.S. Cl. .................. 296/26.04; 296/165; 296/26.01

(58) Field of Classification Search .................. 296/165, 296/173, 26.01, 26.04, 26.05, 26.06, 26.07
See application file for complete search history.

(56) References Cited

U.S. PATENT DOCUMENTS

| | | | | |
|---|---|---|---|---|
| 3,271,066 A | * | 9/1966 | Teague | 296/26.07 |
| 3,508,786 A | * | 4/1970 | Colville | 296/26.04 |
| 3,713,687 A | * | 1/1973 | Hooks et al. | 296/26.06 |
| 3,781,059 A | * | 12/1973 | Davis | 296/26.04 |
| 3,879,080 A | * | 4/1975 | Freeman | 296/26.06 |
| 4,758,038 A | * | 7/1988 | Okada | 296/26.06 |
| 7,093,891 B2 | * | 8/2006 | Gervasi | 296/165 |
| 2005/0151015 A1 | | 7/2005 | Cagle et al. | |
| 2005/0230988 A1 | * | 10/2005 | Kim et al. | 296/26.01 |
| 2006/0103083 A1 | * | 5/2006 | Connors | 296/26.04 |
| 2007/0029830 A1 | * | 2/2007 | Wang | 296/26.06 |

* cited by examiner

*Primary Examiner*—Lori L Lyjak
(74) *Attorney, Agent, or Firm*—Global IP Counselors (57) ABSTRACT

A vehicle body basically has a first body panel section, a second body panel section, an expandable body panel section and an actuation device. The first and second body panel sections have first and second exterior surfaces. The expandable body panel section has a third exterior surface disposed between the first and second exterior surfaces of the first and second body panel sections to form a contiguous vehicle exterior. The actuation device is operatively coupled to at least one of the body panel sections to move the first body panel section with respect to the second body panel by stretch the expandable body panel section from a first surface area with the first body panel section being in a first location to a second larger surface area with the first body panel section being in a second location.

13 Claims, 7 Drawing Sheets

VEHICLE BODY WITH EXPANDABLE VEHICLE BODY PANEL

BACKGROUND OF THE INVENTION

1. Field of the Invention

The present invention generally relates to vehicle body panels. More specifically, the present invention relates to a vehicle body panel that is expandable to enlarge an interior area of the vehicle or change the exterior appearance of the vehicle.

2. Background Information

There are many different types of vehicles that are currently on the market. Some vehicles have certain features that change the interior area of the vehicle or change the exterior appearance of the vehicle. For example, some vehicles are provided with removable or retractable panels such as sunroofs and convertible tops. With a vehicle having a sunroof, opening the sunroof does not increase the interior area of the vehicle, but substantially maintains a rigid roof over the passengers. On the other hand, with a vehicle having a convertible top, retracting the top increases the interior area of the vehicle and allows for unlimited headroom, but results in a vehicle with out a rigid roof.

Recently, four-seat coupe type vehicles are becoming increasingly popular in the U.S. market because they are small (lower MPG) and they provide sporty style and image. Depending on the design of the vehicle body, the vehicle may have certain drawbacks. One issue with most of these coupe type vehicles is that that the second row or rear seating area is uncomfortable for adults in terms of headroom and legroom. For example, with a two door coupe, the roof typically slants downwardly such that the headroom is typically limited above the rear seating area. This type of slanting roof in a coupe provides a very attractive and sporty look. However, slanting roof in a coupe may be uncomfortable for some large adults. For this reason, many customers who want the small size/sporty style of a coupe will opt for a larger more practical vehicle such as a sedan that can comfortably fit adults/kids in the second row. In the case of a sedan, more headroom is provided over the rear seating area, but the sporty look is often compromised a little bit.

In view of the above, it will be apparent to those skilled in the art from this disclosure that there exists a need for an improved vehicle body with an expandable panel that can be easily transformed to either enlarge an interior area of the vehicle or change the exterior appearance of the vehicle. This invention addresses this need in the art as well as other needs, which will become apparent to those skilled in the art from this disclosure.

SUMMARY OF THE INVENTION

One object of the present invention is to provide a vehicle body that can be easily transformed to enlarge an interior area of the vehicle or change the exterior appearance of the vehicle.

In another object of the present invention is to provide a vehicle body that has the benefits of the sporty look of a coupe, but the headroom of a sedan.

In view of the foregoing objects, a vehicle body is provided that basically comprises a first body panel section, a second body panel section, an expandable body panel section and an actuation device. The first body panel section has a first exterior surface. The second body panel section has a second exterior surface. The expandable body panel section has a third exterior surface disposed between the first and second exterior surfaces of the first and second body panel sections to form a contiguous vehicle exterior. The actuation device is operatively coupled to at least one of the body panel sections to move the first body panel section with respect to the second body panel to stretch the expandable body panel section from a first surface area with the first body panel section being in a first location to a second surface area with the first body panel section being in a second location such that the second surface area is larger than the first surface area.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
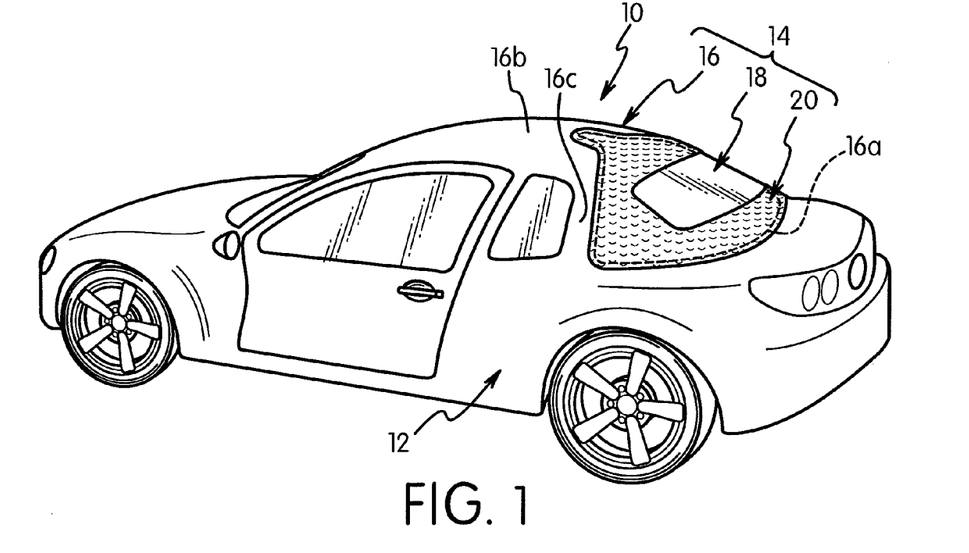
FIG. 1 is a side perspective view of a vehicle that includes a vehicle body having an expandable roof structure in a retracted (coupe style) location or position in accordance with a first illustrated embodiment.

Referring initially to FIG. 1, a vehicle 10 is illustrated with a vehicle body 12 in accordance one preferred embodiment. Basically, the vehicle body 12 has an expandable vehicle body panel or roof 14 that is expandable to enlarge an interior area of the vehicle 12 and/or change the exterior appearance of the vehicle 10. While the expandable vehicle body panel 14 is a rear roof structure, it will be apparent to those skilled in the art from this disclosure that the expandable vehicle body panel as disclosed herein can be used on any other of part of the vehicle body where it would be desirable to transform either an interior area of the vehicle or an exterior appearance of the vehicle.

The vehicle 10 includes numerous conventional design features, structural elements, suspension and power train components whose description has been omitted for brevity. It should be understood that mainly those elements of the vehicle 10 that assist in understanding the various features of the expandable vehicle body panel are described below. In the first illustrated embodiment, the expandable vehicle body panel or roof 14 is basically provided a main roof panel 16, a transparent rear window 18 and an expandable sub roof panel 20. In the first illustrated embodiment, the rear window 18 constitutes a first body panel section of the vehicle body 12, while the main roof panel 16 constitutes a second body panel section of the vehicle body 12. The expandable sub roof panel 20 constitutes a third or expandable body panel section of the vehicle body 12 in the first illustrated embodiment. Generally speaking, the main roof panel 16 and the rear window 18 are non-stretchable panels (i.e., non-resilient in a direction transverse to their thicknesses), while the expandable sub roof panel 20 is a stretchable panel (i.e., resilient in a direction transverse to its thickness). Also, the main roof panel 16 and the rear window 18 are more rigid (i.e., less flexible) than the expandable sub roof panel 20.

Figure 2:
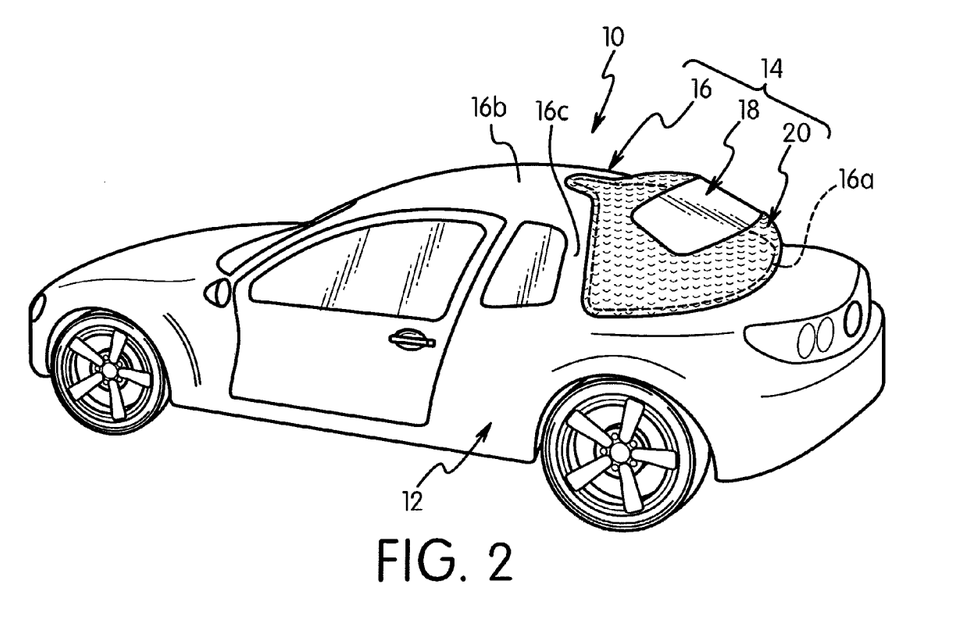
FIG. 2 is a side perspective view of the vehicle illustrated in FIG. 1 with the expandable roof structure in an expanded (sedan style) location or position.
Figure 3:
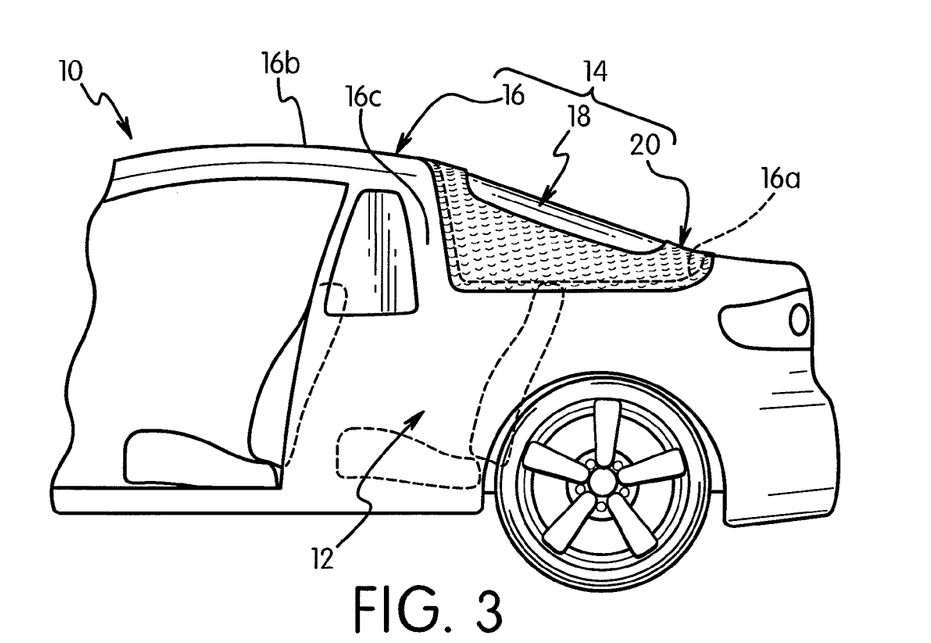
FIG. 3 is a partial side elevational view of the vehicle illustrated in FIGS. 1 and 2 with the expandable roof structure in the retracted (coupe style) location or position.
Figure 4:
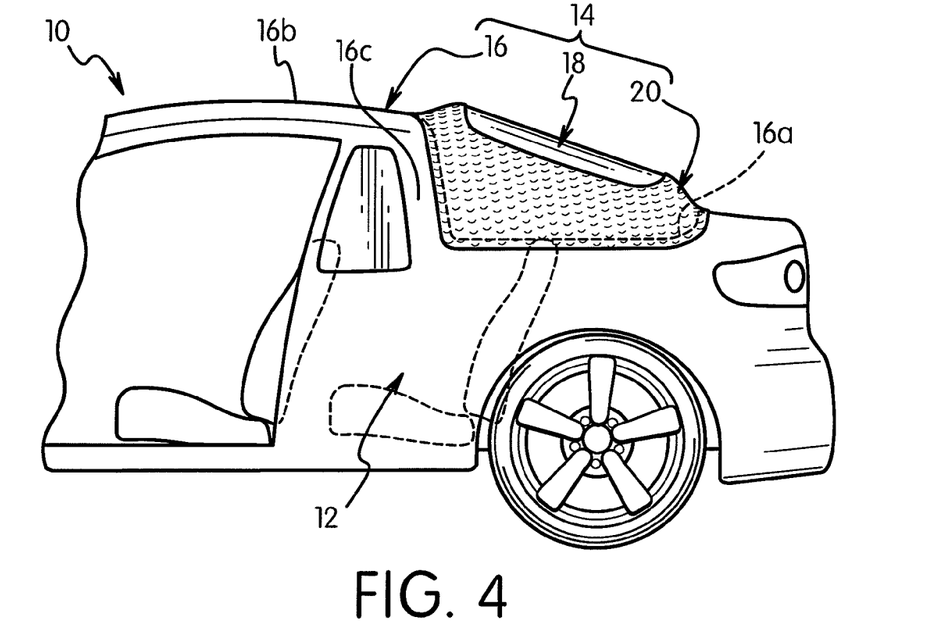
FIG. 4 is a side perspective view, similar to FIG. 1, of the vehicle illustrated in FIGS. 1 to 3 with the expandable roof structure in the expanded (sedan style) location or position.

As seen in FIGS. 1 to 4, the increase in headroom is accomplished by using an adaptable composite material for the expandable sub roof panel 20 that surrounds the rear window 18. The expandable sub roof panel 20 is fastened to the main roof panel 16 and the rear window 18 so that the rear window 18 can be moved outwardly to provide more headroom. In particular, the expandable sub roof panel 20 stretches such that the rear window 18 is movable from a first (retracted) location to a second (extended) location to provide additional head room over the rear seating area of the interior of the vehicle 10. In other words, the rear window 18 moves with respect to the main roof panel 16 to stretch the expandable sub roof panel 20 from a first surface area, when the rear window 18 is in the first (retracted) location as seen in FIGS. 1 and 3, to a second surface area, when the rear window 18 is in the second (extended) location as seen in FIGS. 2 and 4. Thus, the second surface area of the expandable sub roof panel 20 becomes larger than the first surface area of the expandable sub roof panel 20, when the rear window 18 is in the second (extended) location to increase the head room over the rear seating area.

Figure 5:
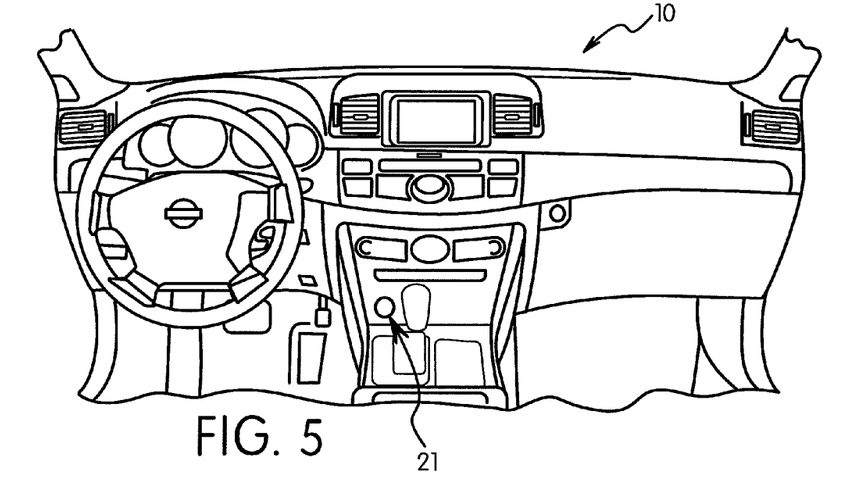
FIG. 5 is a partial interior view of the vehicle illustrated in FIGS. 1 to 4 showing an actuation button for actuating the expandable roof structure.
Figure 6:
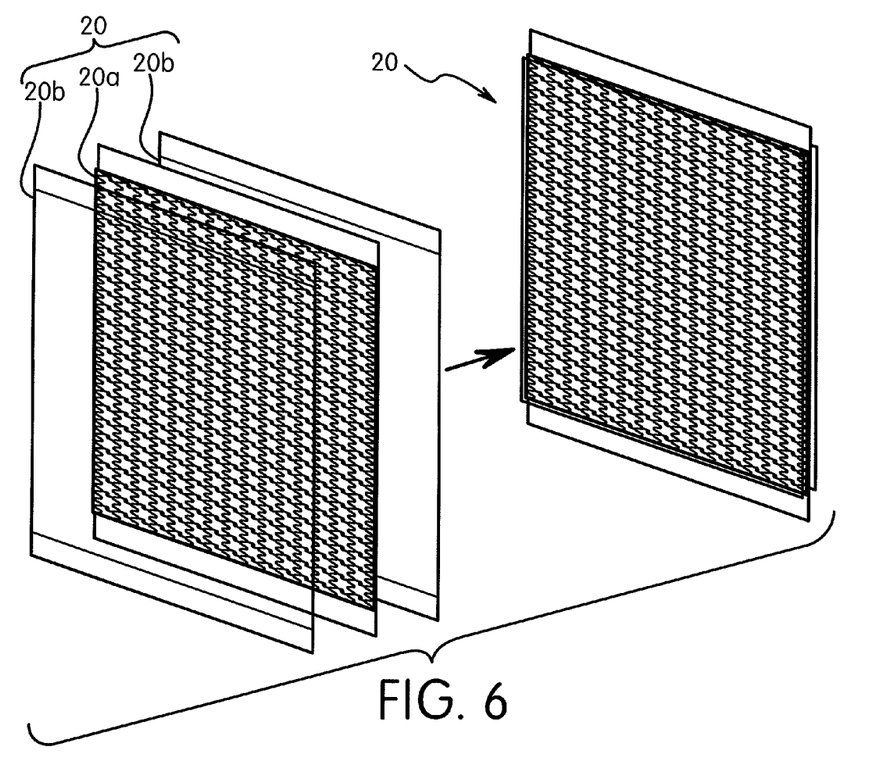
FIG. 6 is a simplified schematic view of a part of an expandable body panel section for the expandable roof structure of the vehicle illustrated in FIGS. 1 to 5.
Figure 7:
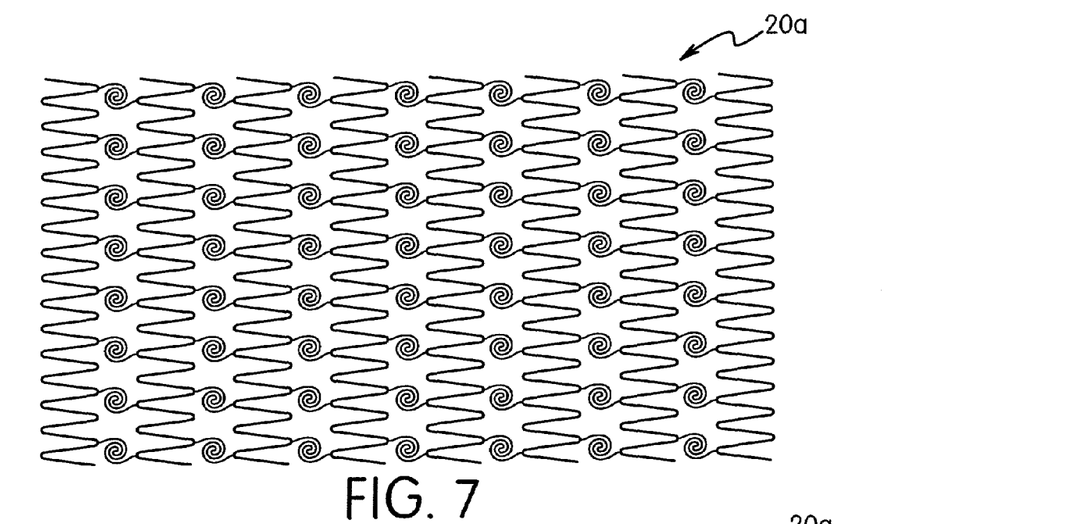
FIG. 7 is an example of a part of a stiff internal skeleton for expandable body panel section illustrated in FIG. 6, with the stiff internal skeleton in a non-expanded state.
Figure 8:
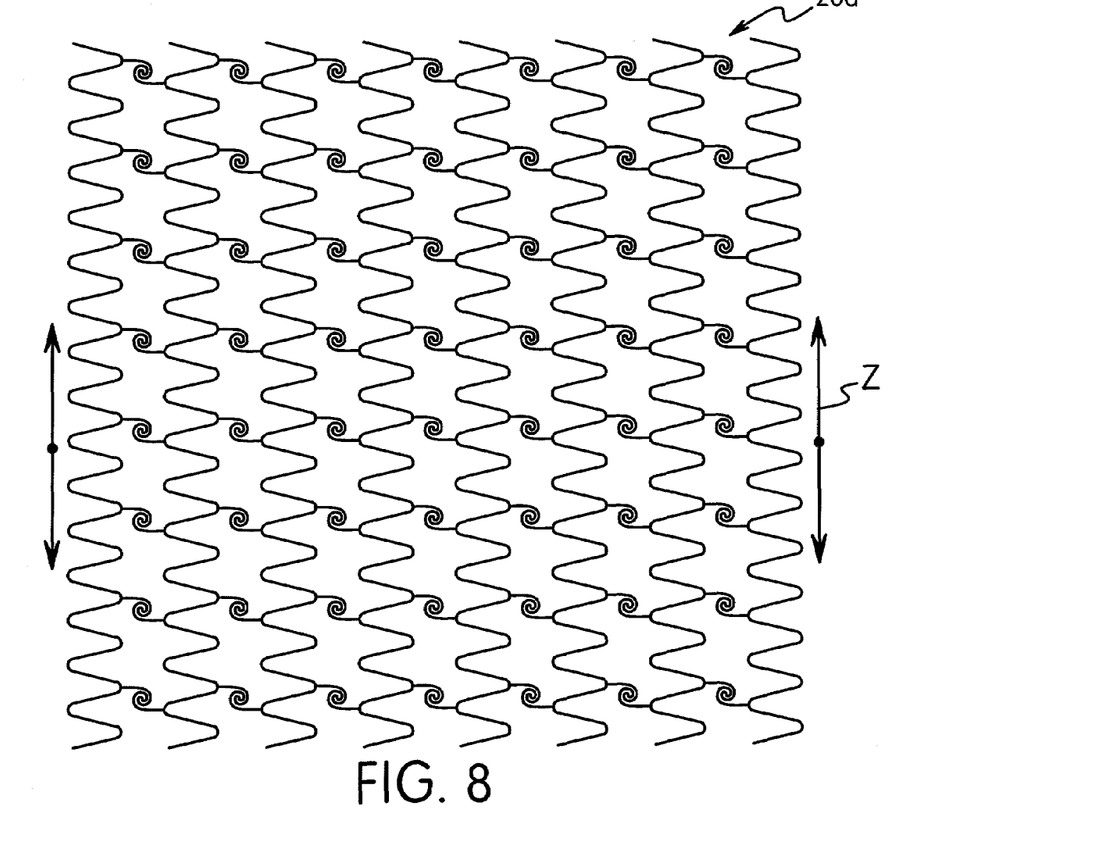
FIG. 8 is an example of the stiff internal skeleton in FIG. 7, with the stiff internal skeleton in expanded in a first direction.
Figure 9:
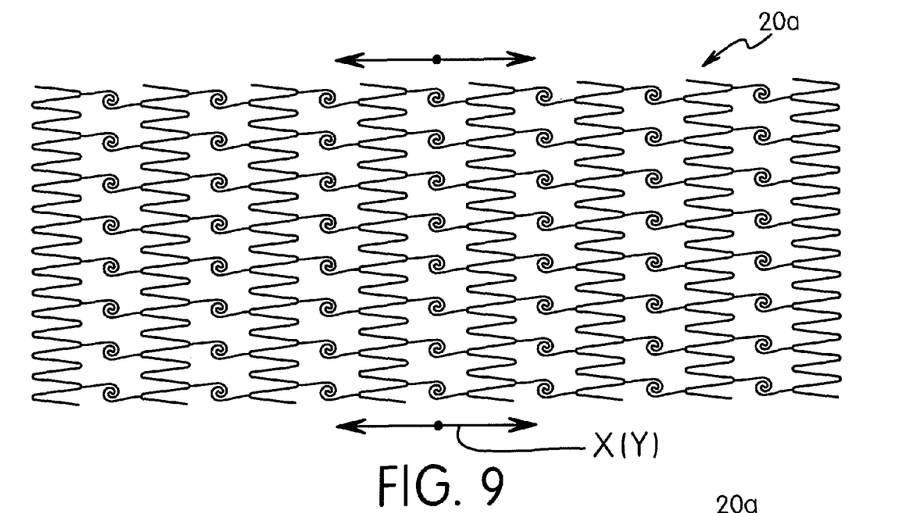
FIG. 9 is an example of the stiff internal skeleton in FIG. 7, with the stiff internal skeleton in expanded in a second direction that is perpendicular to the first direction of FIG. 8.
Figure 10:
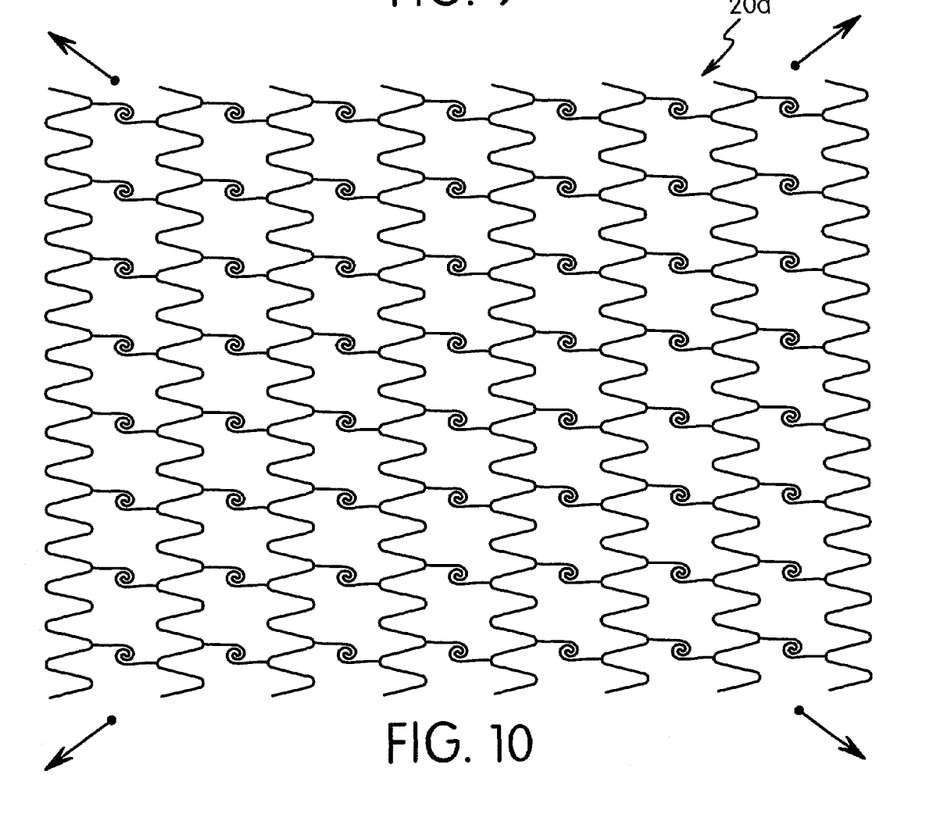
FIG. 10 is an example of the stiff internal skeleton in FIG. 7, with the stiff internal skeleton in expanded in both the first and second directions that are shown in FIGS. 8 and 9.
Figure 11:
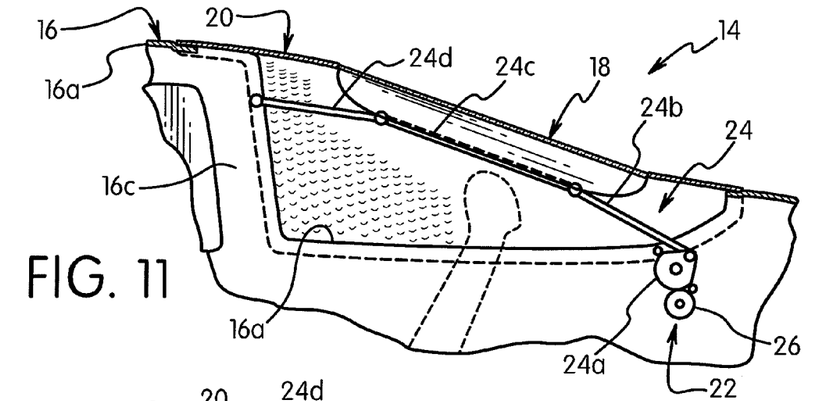
FIG. 11 is a partial side elevational view of the vehicle illustrated in FIGS. 1 to 5 with the expandable roof structure in the retracted (coupe style) location or position.
Figure 12:
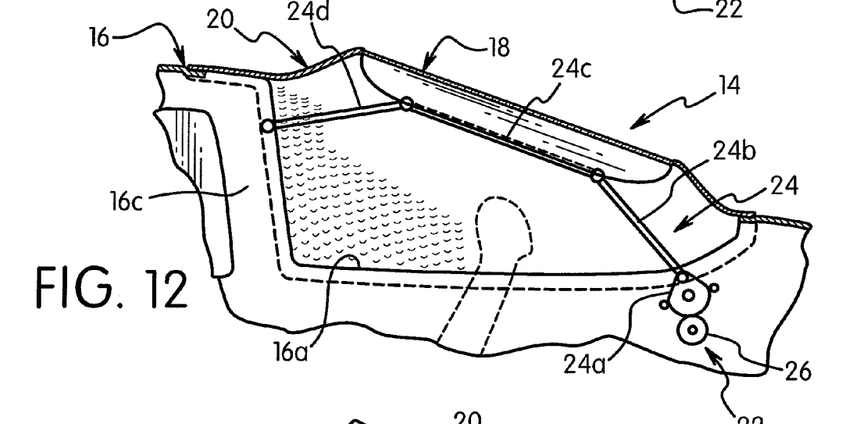
FIG. 12 is a partial side elevational view, similar to FIG. 11, of the vehicle illustrated in FIGS. 1 to 5 with the expandable roof structure in the expanded (sedan style) location or position.
Figure 13:
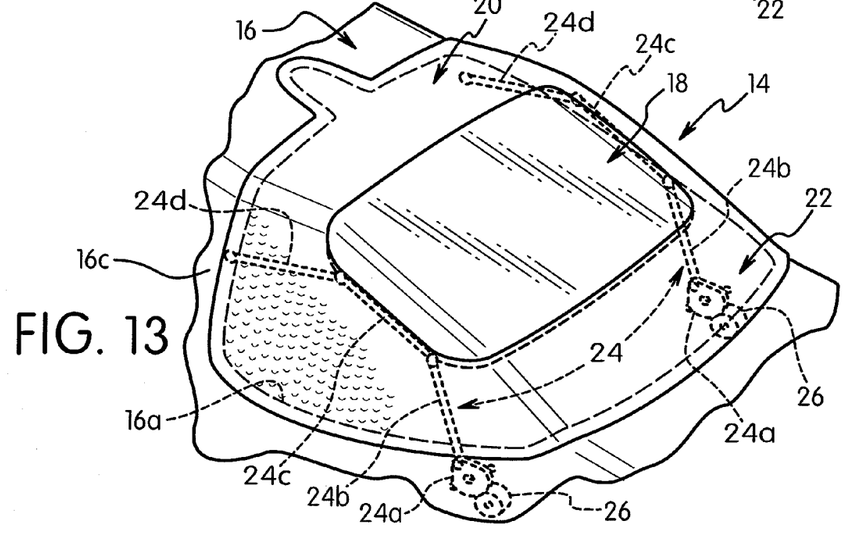
FIG. 13 is a top perspective view of the vehicle illustrated in FIGS. 1 to 5 with the expandable roof structure in the expanded (sedan style) position.

In the first illustrated embodiment, the rear window 18 is movably supported by an actuation system or device 22. The actuation system or device 22 is operatively coupled between the main roof panel 16 and the rear window 18 to stretch the expandable sub roof panel 20 as seen in FIGS. 11 to 13. The actuation device 22 is operated by a switch 21 (e.g., a control button) located in the interior of the vehicle 10 such as seen in FIG. 5. The switch 21 for the actuation device 22 can be located on the vehicle's instrument panel as shown or any other convenient as such as on an overhead console (like a convertible top switch).

The actuation device 22 basically includes a pair of linkages 24 and a pair of rotary motors 26. The motors 26 are operatively coupled to the linkages 24 to move the rear window 18 (i.e., the first body panel section) between the first and second locations. Thus, the vehicle 10 has the benefits of both the sporty look of a coupe when the rear window 18 is in the first location and the headroom of a sedan when the rear window 18 is in the second location.

Each of the linkages 24 has a gear 24a, a first link 24b, a second link 24c and a third link 24d. The gears 24a are pivotally mounted to the main roof panel 16, but could be mounted in any other suitable location as needed and/or desired. The rotary motors 26 are electric motors with each having an output shaft with an output gear engaged with a respective one of the gears 24a. The rotary motors 26 are synchronized to move the gears 24a together. Of course, other types of drive mechanism can be used instead of the rotary motors 26.

The first links 24b have first ends that are pivotally connected to the gears 24a and second ends pivotally coupled to first ends of the second links 24c, respectively. The second links 24c are fixed to opposite lateral edges of the rear window 18. The second links 24c have first ends that are pivotally connected to the third links 24d, respectively. The third links 24d have their second ends pivotally connected to the main roof panel 16. Thus, to add headroom, the motors 26 are energized such the first links 24b are pushed towards the rear window 18 causing the second links 24c and the third links 24d to pivot, which in turn stretches the expandable sub roof panel 20 and moves the rear window 18 outwardly relative to the main roof panel 16.

In operating the actuation device 22, the rotary motors 26 turn the gears 24a, which turn the first links 24b to move the linkages 24 in a similar manner to a soft top convertible actuation system. Since a portion of the second links 24c are rigidly attached to the rear window 18, when the rotary motors 26 are operated, the linkages 24 moves and causes the position of the rear window 18 to move upwards (in z direction). The actuation device 22 then locks the rear window 18 position in place. The adaptable composite material forming the expandable sub roof panel 20 that is attached to the rear window 18 and the roof panel 16 stretches as the position of the rear window 18 is shifted. In a relaxed state (when the adaptable composite material forming the expandable sub roof panel 20 is not stretched) the linkages 24 of the actuation device 22 function as a support system for the rear window 18 and the adaptable composite material forming the expandable sub roof panel 20.

While in this illustrated embodiment, the actuation device 22 is attached to the rear window 18 and the main roof panel 16, i.e., between the first and second body panel sections, it is also possible to provide an actuation device 22 within the expandable sub roof panel 20 that can stretch the expandable sub roof panel 20 and move the rear window 18 outwardly relative to the main roof panel 16. In other words, the actuation device 22 can be any device that is attached to at least one of the main roof panel 16, the rear window 18 and the expandable sub roof panel 20 as needed and/or desired.

Preferably, the main roof panel 16 is formed with a unibody construction with the remaining part of the vehicle body 12, but can alternatively be constructed using any of a variety of other conventional construction techniques. Thus, the main roof panel 16 is a rigid, non-flexible panel constructed of a rigid material such a sheet metal that is typically used in unibody construction. Thus, the main roof panel 16 is not a foldable material that plastic deforms when folded. The main roof panel 16 has an opening 16a with the rear window 18 disposed in the opening 16a. Preferably, the main roof panel 16 includes a roof portion 16b and a pair of C-pillars 16c at least partially defining the opening 16a. While the main roof panel 16 is illustrated as being directly connected to the expandable sub roof panel 20, it will be apparent form this disclosure that a molding or the like can be used to interconnect the main roof panel 16 to the expandable sub roof panel 20 as needed and/or desired.

The expandable sub roof panel 20 connects the main roof panel 16 to the rear window 18 to form contiguous vehicle exterior of the vehicle body 12. In other words, the main roof panel 16 (first body panel section) has a first exterior surface and the rear window 18 (second body panel section) has a second exterior surface, with expandable sub roof panel 20 (expandable body panel section) having a third exterior surface disposed between the first and second exterior surfaces of the main roof panel 16 and the rear window 18 to form the contiguous vehicle exterior.

The rear window 18 is a rigid, non-flexible panel constructed of a rigid material such as glass or a hard rigid plastic material. The rear window 18 is illustrated as being slightly curved, but it could be a flat panel. The peripheral edge of the rear window 18 is connected to the expandable sub roof panel 20 to form a waterproof connection therebetween. While the rear window 18 is illustrated as being directly connected to the expandable sub roof panel 20, it will be apparent form this disclosure that a molding or the like can be used to interconnect the rear window 18 to the expandable sub roof panel 20 as needed and/or desired.

Preferably, the expandable sub roof panel 20 is made using the adaptive composite skin technology (ACTS) disclosed in United States Patent Application No. 2005/0151015. The adaptable composite skin technology was developed by NASA for the purpose of achieving wind shape changes in mid-flight (to create different aerodynamic properties). The adaptable composite material as used for the expandable sub roof panel 20 provides a stretchable material that can change shape while still maintaining some rigidity and a very smooth exterior surface (no abrupt exterior surface changes when in either the unstretch state or the stretch state. Generally, the adaptable composite material that is used for the expandable body panel includes a two-dimensional "planar spring" embedded in an elastomeric material. The adaptable composite material provides a smooth aerodynamic covering capable of global elongation exceeding 20% with a low input force. Accordingly, the expandable sub roof panel 20 is a self supporting structure that maintains its shape in its original unstressed state.

As seen in FIGS. 6 to 10, the expandable sub roof panel 20 includes a stiff internal skeleton 20a and a pair of flexible solid materials 20b coupled to the stiff internal skeleton 20a, with one of the flexible solid material 20b forming a part of the vehicle's exterior surface. The stiff internal skeleton 20a of the adaptable composite material (the expandable sub roof panel 20) includes a plastic, composite or metallic core layer (about 1 mm thick) with a series of holes cut into it (by laser etching, stamping, etc) such that the core layer acts as a planar spring. The stiff internal skeleton 20a is provided with zigzag parts connected by spirals that give the expandable sub roof panel 20 its stiffness to function as a rigid body panel and resiliency to stretch and return to its original unstressed state. The stiff internal skeleton 20a is stretchable in both directions (e.g., in the z-direction to stretch upwardly and in the x(y)-direction to stretch horizontally) for moving the rear window 18 with respect the remainder of the vehicle body. The stiff internal skeleton 20a (the core layer) is bonded to the flexible solid materials 20b. Each of the flexible solid materials 20b includes a fine mesh layer which is a metal or composite mesh (<1 mm thick). Preferably, the stiff internal skeleton 20a (the core layer) and the flexible solid materials 20b (the fine mesh layers) are bonded together with an elastomer material. Thus, the total assembly forming the expandable sub roof panel 20 has an overall thickness of about 2-3 mm.

While in the illustrated embodiment, the core layer (the stiff internal skeleton 20a) is illustrated as being sandwiched between two fine mesh layers (the flexible solid materials 20b), alternatively the core layer (the stiff internal skeleton 20a) can be attached to one fine mesh layer. The core design determines the rigidity and shape change of the adaptable composite material (e.g., the expandable sub roof panel 20). The fine mesh layer (the flexible solid materials 20b) provides a smooth exterior surface during shape change.

There any many possible designs for both the core and fine mesh layers, depending on what type of shape change or stretch is desired. Also the length and width of the entire assembly is almost limitless. Thus, the adaptable composite material is a tailorable elastic skin for covering shape-changing, or "morphable," structures that can be tailored for lightweight, lightly loaded applications, or for more heavily loaded conditions as needed and/or desired.

Figure 14:
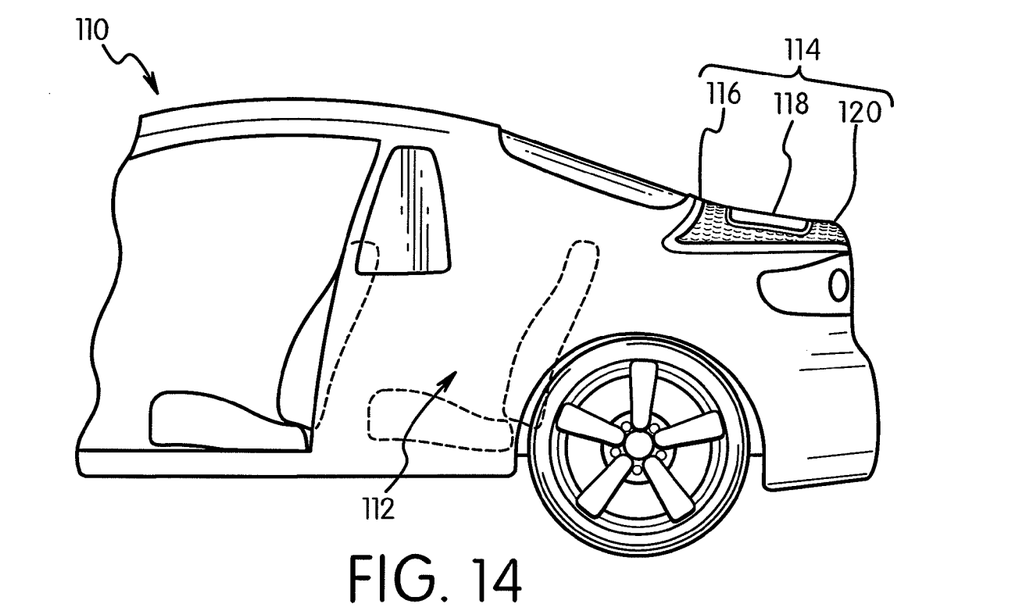
FIG. 14 is a partial side elevational view of a vehicle that includes a vehicle body having an expandable trunk structure in a retracted location or position in accordance with a second illustrated embodiment.
Figure 15:
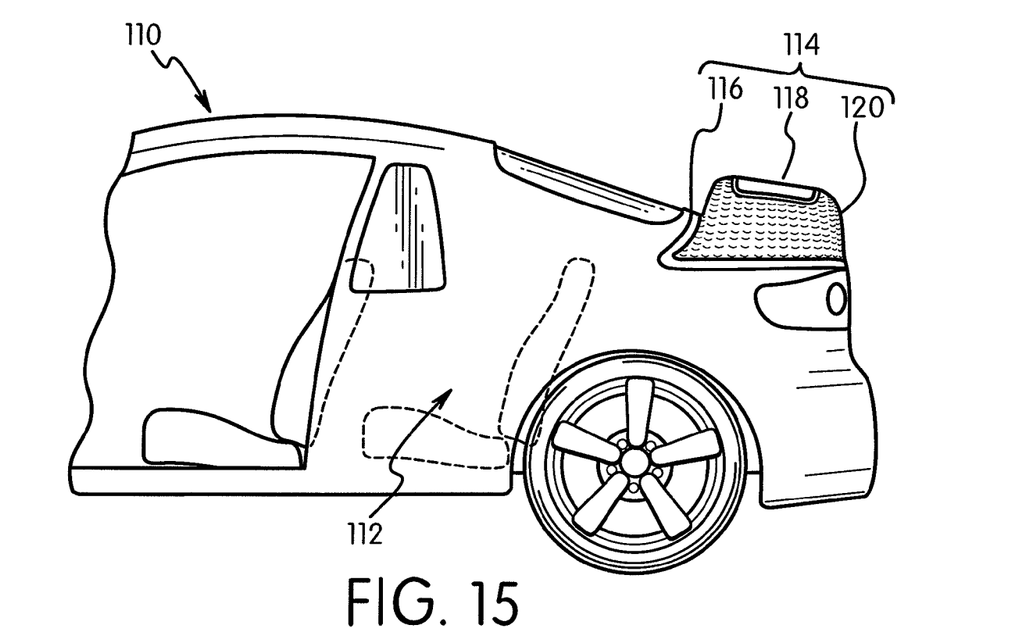
FIG. 15 is a partial side elevational view of the vehicle illustrated in FIG. 1 with the expandable trunk structure in an expanded location or position in accordance with the second illustrated embodiment.

In this illustrated embodiment, the expandable sub roof panel 20 completely surrounds the peripheral edge of the rear window 18 (i.e., the first body panel section). However, other arrangements are possible. For example, the rear window 18 could have one end hinged to the main roof panel 16 such that the expandable sub roof panel 20 is only coupled to three edges of the rear window 18. Moreover, while the expandable vehicle body panel 14 is part of a rear roof structure, it will be apparent to those skilled in the art from this disclosure that the expandable vehicle body panel can be disposed over the front seating area or could be used to expand the trunk space of the vehicle as seen in FIGS. 14 and 15. In other words, the expandable vehicle body panel as disclosed herein can be used on any other of part of the vehicle body where it would be desirable to transform either an interior area of the vehicle or an exterior appearance of the vehicle.

In the embodiment of FIGS. 14 and 15, a vehicle 110 is illustrated with an expandable trunk lid 114 as another example of an expandable vehicle body panel. Basically, the expandable trunk lid 114 is basically provided a main trunk panel 116, a center sub panel 118 and an expandable sub panel 120 that surrounds the center sub panel 118. The expandable sub panel 120 is fastened to the main trunk panel 116 and the center sub panel 118 so that the center sub panel 118 can be moved outwardly to provide more cargo area in the trunk. Similar to the first embodiment, the expandable sub panel 120 stretches such that the center sub panel 118 is movable from a first (retracted) location to a second (extended) location to provide additional cargo area in the trunk of the vehicle 110. An actuation system or device is provided for moving the center sub panel 118 in the same manner that the actuation device 22 moves the rear window 18, as discussed above.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body comprising:
a first body panel section having a first exterior surface;
a second body panel section having a second exterior surface;
an expandable body panel section of a stretchable material having a third exterior surface disposed between the first and second exterior surfaces of the first and second body panel sections to form a contiguous vehicle exterior; and
an actuation device operatively coupled to at least one of the body panel sections to move the first body panel section with respect to the second body panel to stretch the expandable body panel section from a first surface area with the first body panel section being in a first location to a second surface area with the first body panel section being in a second location such that the second surface area is larger than the first surface area.

2. The vehicle body according to claim 1, wherein the first body panel section includes a transparent window.

3. The vehicle body according to claim 2, wherein the second body panel section includes a roof portion and a pair of C-pillars.

4. The vehicle body according to claim 2, wherein the expandable body panel section surrounds the first body panel section.

5. The vehicle body according to claim 1, wherein the expandable body panel section surrounds the first body panel section.

6. The vehicle body according to claim 1, wherein the first and second body panel sections are rigid panels.

7. A vehicle body comprising:
a first body panel section having a first exterior surface;
a second body panel section having a second exterior surface;
an expandable body panel section of a stretchable material having a third exterior surface disposed between the first and second exterior surfaces of the first and second body panel sections to form a contiguous vehicle exterior; and
an actuation device operatively coupled to at least one of the body panel sections to move the first body panel section with respect to the second body panel to stretch the expandable body panel section from a first surface area with the first body panel section being in a first location to a second surface area with the first body panel section being in a second location such that the second surface area is larger than the first surface area,
the expandable body panel section including a stiff internal skeleton and a flexible solid material coupled to the stiff internal skeleton, with the flexible solid material forming the third exterior surface of the vehicle exterior.

8. The vehicle body according to claim 1, wherein the actuation device is attached to the first body panel section.

9. A vehicle body comprising:
a first body panel section having a first exterior surface;
a second body panel section having a second exterior surface;
an expandable body panel section of a stretchable material having a third exterior surface disposed between the first and second exterior surfaces of the first and second body panel sections to form a contiguous vehicle exterior; and
an actuation device operatively coupled to at least one of the body panel sections to move the first body panel section with respect to the second body panel to stretch the expandable body panel section from a first surface area with the first body panel section being in a first location to a second surface area with the first body panel section being in a second location such that the second surface area is larger than the first surface area,
the actuation device including a pair of linkages coupled between the second body panel section and respective opposite sides of the first body panel section.

10. The vehicle body according to claim 8, wherein the actuation device further includes at least one motor operatively coupled to one of the linkages to move the first body panel section between the first and second locations.

11. A vehicle body comprising:
a first body panel section having a first exterior surface;
a second body panel section having a second exterior surface;
an expandable body panel section of a stretchable material having a third exterior surface disposed between the first and second exterior surfaces of the first and second body panel sections to form a contiguous vehicle exterior; and an actuation device operatively coupled to at least one of the body panel sections to move the first body panel section with respect to the second body panel to stretch the expandable body panel section from a first surface area with the first body panel section being in a first location to a second surface area with the first body panel section being in a second location such that the second surface area is larger than the first surface area, the expandable body panel section being constructed using an adaptive composite material.

12. A method of providing additional interior area in a vehicle comprising:

provicing a vehicle body at least partially define an interior space of the vehicle;

providing a movable body panel in the vehicle body disposed over the interior space of the vehicle;

connecting the vehicle body and the movable body panel with an expandable body panel of a stretchable material; and moving the movable body panel from a first location to a second location with respect to the vehicle body such that a first prescribed amount of interior space is provided while the movable body panel is in the first location, and that a second prescribed amount of interior space is provided while the movable body panel is in the second location by stretching the expandable body panel from a first surface area to a second surface area with the second surface area being larger than the first surface area.

13. The method of providing additional interior area according to claim 12, wherein the vehicle body includes a roof structure, and the movable body panel includes a rear windshield disposed over a rear seating area of the passenger compartment.

* * * * *